United States Patent
Hsu

(10) Patent No.: US 8,279,078 B2
(45) Date of Patent: Oct. 2, 2012

(54) COMMUNICATION DEVICE AND LIGHT GUIDING MEMBERS USED THEREIN

(75) Inventor: Shih-Chang Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 729 days.

(21) Appl. No.: 12/507,147

(22) Filed: Jul. 22, 2009

(65) Prior Publication Data

US 2010/0232791 A1    Sep. 16, 2010

(30) Foreign Application Priority Data

Mar. 13, 2009   (CN) .......................... 2009 1 0300819

(51) Int. Cl.
    *G08B 5/00*   (2006.01)
(52) U.S. Cl. ........... 340/815.42; 340/815.4; 340/815.75; 340/539.1; 340/332
(58) Field of Classification Search ............... 340/815.4, 340/815.42, 815.75, 539.1, 332; 250/229, 250/577, 231.13; 356/402, 412, 437, 135, 356/136

See application file for complete search history.

(56) References Cited

U.S. PATENT DOCUMENTS

| 6,172,377 B1 * | 1/2001 | Weiss ............................ 250/577 |
| 6,173,609 B1 * | 1/2001 | Modlin et al. ................... 73/293 |
| 6,872,933 B2 * | 3/2005 | Wirthlin ........................ 250/229 |

FOREIGN PATENT DOCUMENTS

| TW | M265752 | 5/2005 |
| TW | M288474 | 3/2006 |

* cited by examiner

*Primary Examiner* — Daryl Pope

(74) *Attorney, Agent, or Firm* — Altis Law Group, Inc.

(57) ABSTRACT

A communication device includes an enclosure including a recess member including a bottom wall and an accommodating portion, a circuit board mounted on the bottom wall, and a light guiding member received in the accommodating portion. The circuit board includes a plurality of light sources arranged in a circular array. The light guiding member includes a light guiding portion to transmit light from the light sources to an outer surface of the communication device and a light shielding portion to shield the light to the outer surface and fix the light guiding portion in the accommodating portion. The light guiding portion includes a light guiding bottom wall surrounding the light sources and a light guiding sidewall. The light guiding sidewall includes an annular end surface to indicate signal strength and a strong signal orientation received by an antenna of the communication device.

13 Claims, 5 Drawing Sheets

COMMUNICATION DEVICE AND LIGHT GUIDING MEMBERS USED THEREIN

BACKGROUND

1. Technical Field

The present disclosure generally relates to communication devices, and more particularly to a communication device displaying a signal of an antenna and a light guiding member used therein.

2. Description of Related Art

In communication devices, such as customer premises equipments (CPEs), for example, an antenna is required to transmit and receive signals. A commonly used communication device includes a plurality of signal lamps, such as light emitting diodes (LEDs), arranged in a line on a printed circuit board (PCB) of the communication device. The number of the plurality of signal lamps illuminated at the same time is used to display signal strength received by the antenna of the communication device. That is, the more the number of the illuminated signal lamps is, the stronger the signal of the antenna is. However, the number of the illuminated signal lamps cannot display a preferable orientation of the stronger signal.

Therefore, a need exists in the industry to overcome the described limitations.

DETAILED DESCRIPTION

Figure 1:
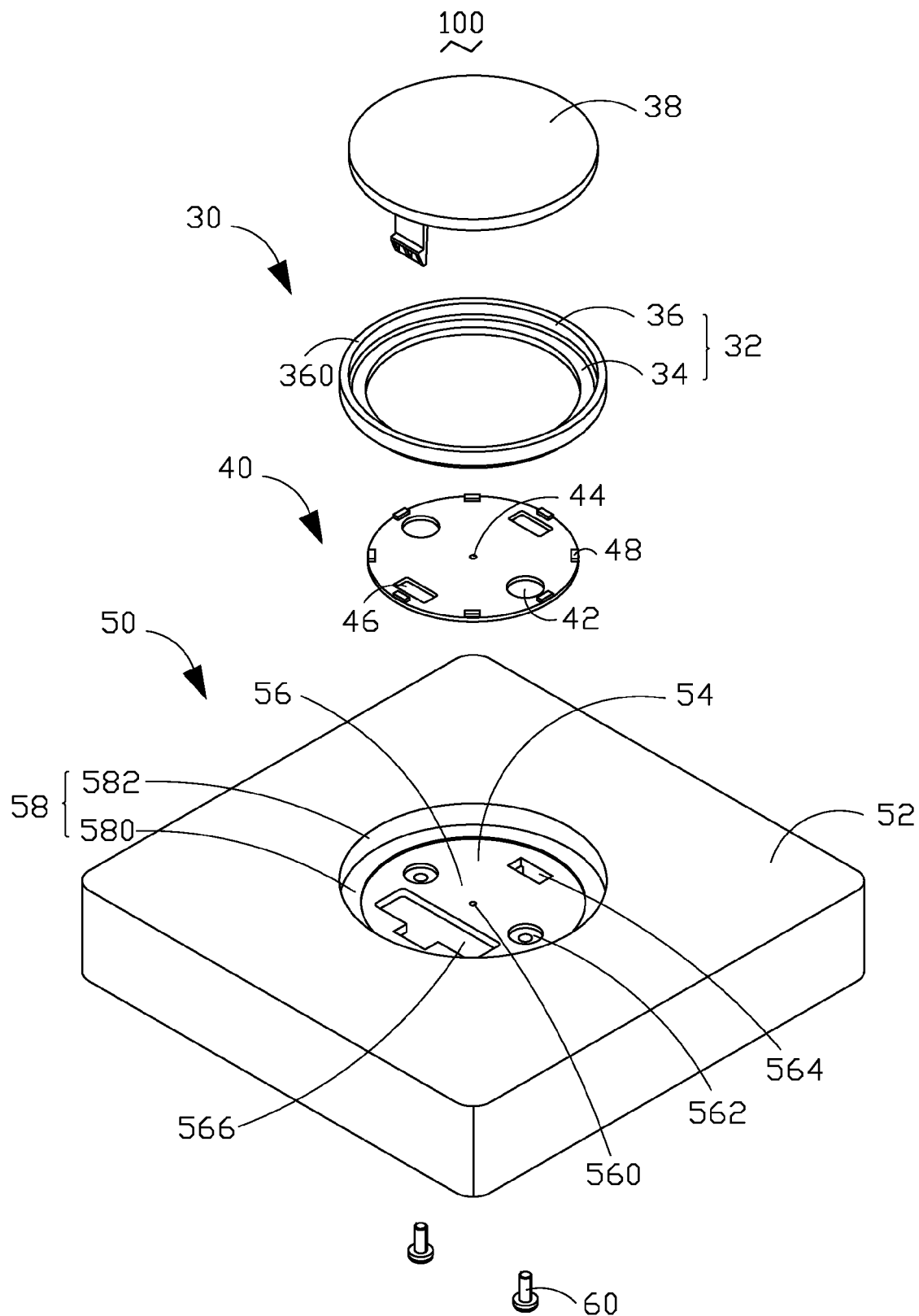
FIG. 1 is an exploded, isometric view of a communication device of the disclosure.

FIG. 1 is an exploded, isometric view of a communication device 100 of the disclosure. The communication device 100 includes an enclosure 50, a substantially circular circuit board 40, and a light guiding member 30 to indicate signal strength and the strong signal orientation received by an antenna (not shown) of the communication device 100.

The enclosure 50 accommodates electronic elements, such as printed circuit boards (PCBs), batteries, a central processing unit (CPU), for example. While the enclosure 50 is substantially rectangular, it will be understood that other configurations may be utilized. The enclosure 50 includes a cover 52. The cover 52 includes a recess member 54 located in a middle portion of the cover 52 to receive the circuit board 40 and the light guiding member 30. The recess member 54 includes a substantially circular bottom wall 56 and an accommodating portion 58. The bottom wall 56 defines a first locating hole 560 located in a center of the bottom wall 56, a pair of mounting holes 562 symmetrical about a first axis of the first locating hole 560, a pair of receiving portions 564 symmetrical about a second axis of the first locating hole 560 perpendicular to the first axis, and a channel 566 in communication with one of the pair of receiving portions 564. Each of the pair of receiving portions 564 includes a substantially rectangular receiving hole 5640 and a receiving post 5642 extending from the bottom wall 56 toward an interior of the enclosure 50 (referring to FIG. 5).

The accommodating portion 58 includes a substantially annular mount 580 extending from the bottom wall 56 toward the cover 52, and an accommodating wall 582 vertically extending from an edge of the mount 580 toward the cover 52.

The circuit board 40 is mounted in the bottom wall 56 of the recess member 54. An outer radius of the circuit board 40 is less than an inner radius of the bottom wall 56, and a thickness of the circuit board 40 is greater than a height of the mount 580. The circuit board 40 includes a plurality of light sources 48 arranged in a circular array at an edge of a surface of the circuit board 40.

In the illustrated embodiment, the plurality of light sources 48 includes eight dual color light emitting diodes (LEDs). The color of the light sources 48 varies according to the signal strength received by the antenna. For example, when a usable signal processed by the communication device 100 is strong, the light sources 48 may display green light. When an interference signal is strong, the light sources 48 may display red light.

The circuit board 40 includes a pair of through holes 42 corresponding to the pair of mounting holes 562, a second locating hole 44 corresponding to the first locating hole 560, and a pair of apertures 46 corresponding to the pair of receiving holes 5640.

The light guiding member 30 includes a transparent light guiding portion 32 to transmit light from the plurality of light sources 48 to an outer surface of the communication device 100, and a nontransparent light shielding portion 38 to shield the light from the plurality of light sources 48 to the outer surface of the communication device 100.

The light guiding portion 32 is received in the accommodating portion 58, and includes a substantially annular light guiding bottom wall 34 and a light guiding sidewall 36 upwardly extending from an edge of the light guiding bottom wall 34. A hypotenuse of a right triangle, such as an isosceles right triangle is formed by a junction of the light guiding bottom wall 34 and the light guiding sidewall 36 (referring to FIG. 3). An outer radius of the light guiding bottom wall 34 is slightly less than an inner radius of the accommodating wall 582, and the outer radius of the circuit board 40 is slightly less than an inner radius of the light guiding bottom wall 34. The light guiding bottom wall 34 surrounds the plurality of the light sources 48, and the plurality of the light sources 48 are adjacent to a surface of the light guiding bottom wall 34 so that maximum light from the plurality of the light sources 48 is introduced into the light guiding sidewall 36. The light guiding sidewall 36 includes an annular end surface 360 substantially parallel to the plurality of light sources 48.

In the illustrated embodiment, the end surface 360 of the light guiding portion 32 is finely textured. Other surfaces of the light guiding portion 32 are polished.

Figure 2:
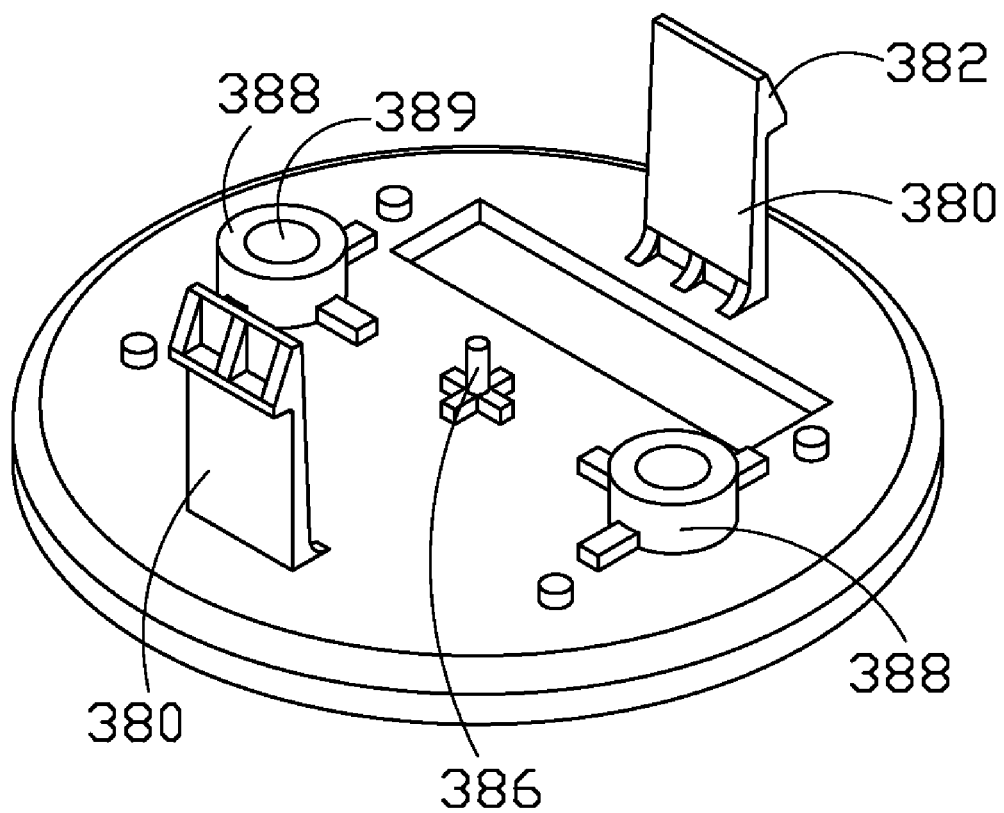
FIG. 2 is an enlarged, inverted, isometric view of a light shielding portion of a light guiding member of FIG. 1.

FIG. 2 is an enlarged, inverted, isometric view of the light shielding portion 38 of the light guiding member 30. The light shielding portion 38 includes a pair of fixing portions 380, a locating post 386 corresponding to the first locating hole 560 and the second locating hole 44, and a pair of retaining posts 388 corresponding to the pair of through holes 42 and the pair of mounting holes 562. Each of the pair of fixing portions 380 includes a hook 382 located at a distal end thereof. Each of the pair of retaining posts 388 defines a threaded hole 389 located in a middle portion thereof. A pair of fasteners 60, such as screws, are fixed in a corresponding threaded hole 389 to fix the light guiding portion 32 in the recess member 54.

Figure 3:
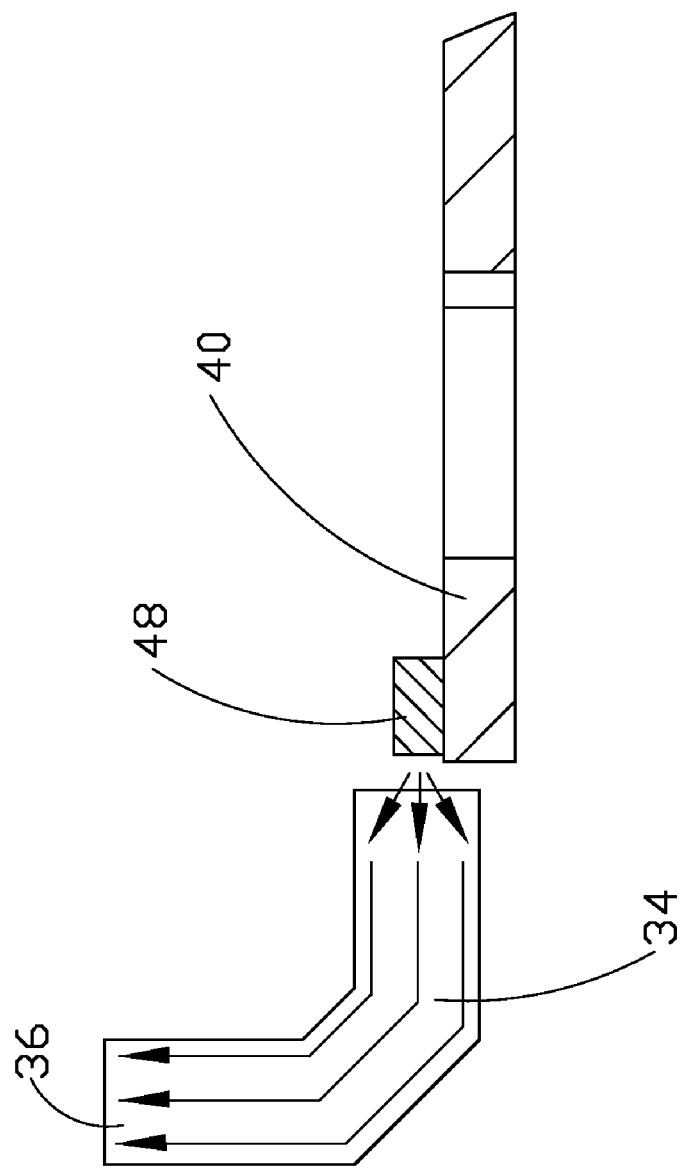
FIG. 3 is a schematic diagram of the light reflecting in the light guiding member of FIG. 1.

FIG. 3 is a schematic diagram of the light from the light sources 48 reflecting in the light guiding member 30. Because the hypotenuse of the right triangle is formed by the junction of the light guiding bottom wall 34 and the light guiding sidewall 36, the light is uniformly and vertically transmitted to the end surface 360 of the light guiding sidewall 36 after the light from the light sources 48 reflects within the light guiding bottom wall 34. Thus, a uniform brightness light ring is obtained. In the illustrated embodiment, the light is presented in an annular display on the end surface 360 of the light guiding member 30 to indicate the signal strength and the strong signal orientation received by the antenna of the communication device 100.

Figure 4:
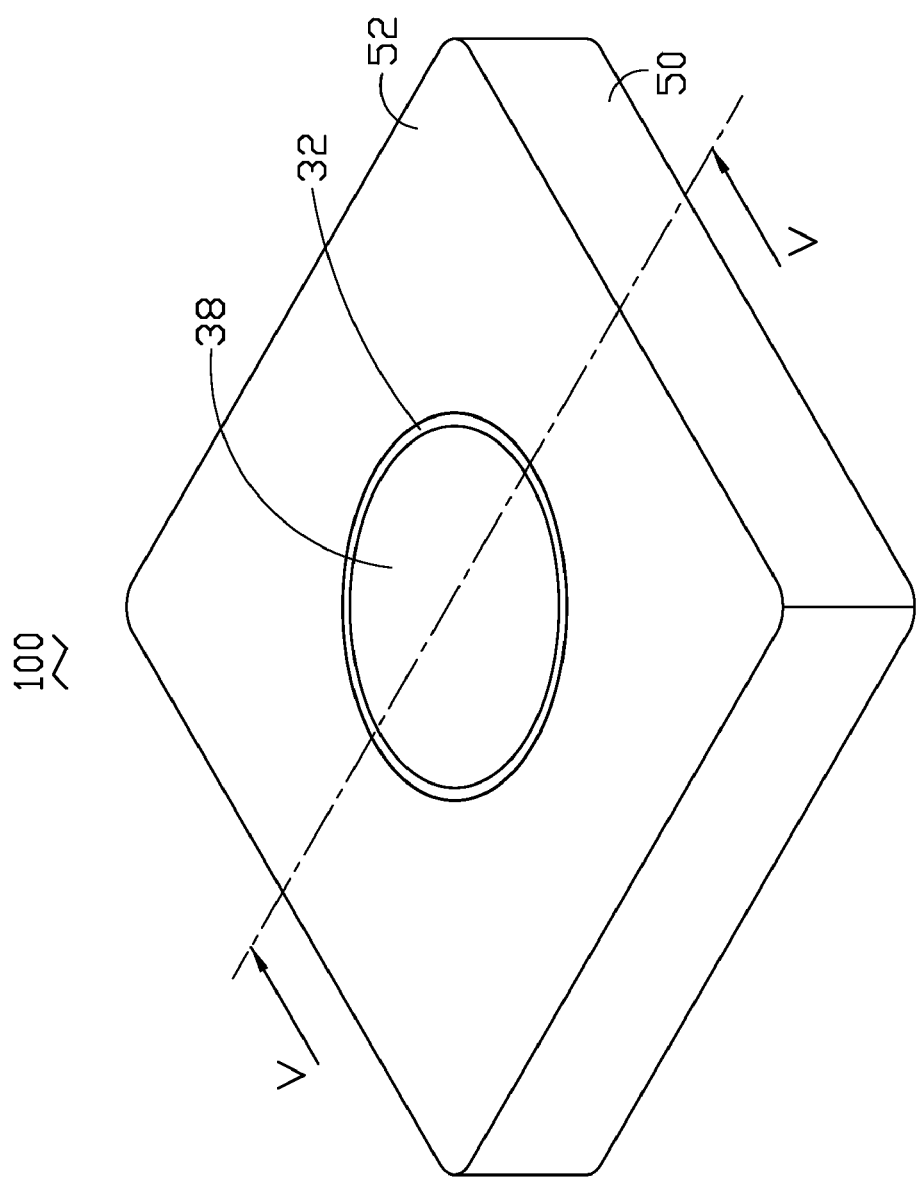
FIG. 4 is an assembled view of FIG. 1.
Figure 5:
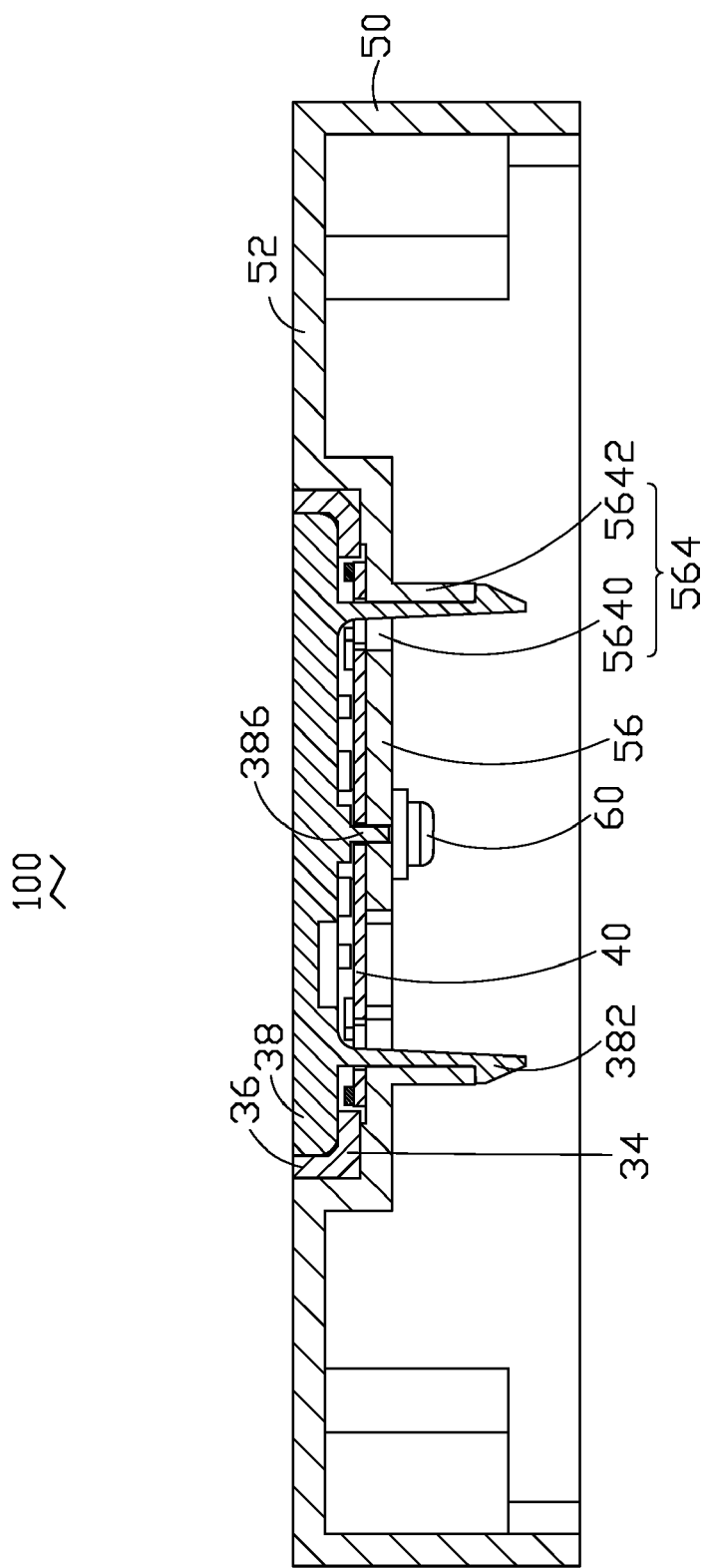
FIG. 5 is a cross-sectional view taken along line V-V of FIG. 4.

Referring to FIGS. 4 and 5, in assembly, the circuit board 40 is mounted on the bottom wall 56. The light shielding portion 38 is attached to the bottom wall 56 with the light guiding portion 32 being fixed in the accommodating portion 58. Thus, the enclosure 50, the circuit board 40, and the light guiding member 30 are assembled into the communication device 100. In this assembled state, the locating post 386 of the light shielding portion 38 is inserted into the first locating hole 560 of the bottom wall 56 and the second locating hole 44 of the circuit board 40. Each of the fixing portions 380 extends through a corresponding receiving hole 5640 with the hook 382 clasping the receiving post 5642 so that the light guiding member 30 cannot accidentally disengage from the accommodating portion 58 of the enclosure 50.

In use, the color of the end surface 360 of the light guiding member 30 varies according to the signal strength. For example, if the usable signal is strong, the end surface 360 displays green light. If the interference signal is strong, the end surface 360 displays red light. An area of the color of the end surface 360 of the light guiding member 30 varies according to the strong signal orientation. For example, if the strong usable signal originates from the left of the communication device 100, an area of the left of the end surface 360 of the light guiding member 30 displays green light. If the strong interference signal originates from the right of the communication device 100, an area of the light of the end surface 360 of the light guiding member 30 displays red light. That is, the color of the end surface 360 indicates the signal strength, and the area of the color of the end surface 360 indicates the strong signal orientation, such that the orientation of a preferable signal is easily identified.

While an embodiment of the present disclosure has been described, it should be understood that it has been presented by way of example only and not by way of limitation. Thus the breadth and scope of the present disclosure should not be limited by the above-described exemplary embodiments, but should be defined only in accordance with the following claims and their equivalents.

What is claimed is:

1. A communication device comprising:
an enclosure comprising a recess member comprising a bottom wall and an accommodating portion extending from the bottom wall;
a circuit board mounted on the bottom wall, the circuit board comprising a plurality of light sources arranged in a circular array on the circuit board; and
a light guiding member received in the accommodating portion, the light guiding member comprising a light guiding portion to transmit light from the plurality of light sources to an outer surface of the communication device and a light shielding portion to shield the light from the plurality of light sources to the outer surface of the communication device and fix the light guiding portion in the accommodating portion, the light guiding portion comprising a light guiding bottom wall surrounding the plurality of light sources and a light guiding sidewall extending from an edge of the light guiding bottom wall, wherein the light guiding sidewall comprises an end surface;
wherein the end surface is substantially annular to indicate signal strength and a strong signal orientation received by an antenna of the communication device.

2. The communication device as recited in claim 1, wherein color of the end surface indicates the signal strength, and an area of the color of the end surface indicates the strong signal orientation.

3. The communication device as recited in claim 1, wherein the end surface of the light guiding member is finely textured and parallel to the plurality of light sources, and other surfaces of the light guiding member are polished.

4. The communication device as recited in claim 3, wherein a hypotenuse of a right triangle is formed by a junction of the light guiding bottom wall and the light guiding sidewall.

5. The communication device as recited in claim 1, wherein the accommodating portion comprises a mount and an accommodating wall extending upwardly from an edge of the mount, wherein a thickness of the circuit board is greater than a height of the mount.

6. The communication device as recited in claim 1, wherein the light shielding portion comprises a pair of fixing portions, a locating post, and a pair of retaining posts, wherein the bottom wall comprises a pair of mounting holes corresponding to the retaining posts, a first locating hole corresponding to the locating post, a pair of receiving portions corresponding to the fixing portions, and a channel in communication with one of the receiving portions.

7. The communication device as recited in claim 6, wherein each of the fixing portions comprises a hook located a distal end thereof.

8. The communication device as recited in claim 7, wherein each of the receiving portions comprises a receiving hole and a receiving post, wherein each of the fixing portions extends through a corresponding receiving hole with the hook clasping the receiving post to fix the light guiding member in the accommodating portion.

9. The communication device as recited in claim 8, wherein the circuit board comprises a pair of through holes corresponding to the pair of mounting holes, a second locating hole corresponding the first locating hole, and a pair of apertures corresponding to the pair of receiving holes.

10. A light guiding member to transmit light from a plurality of light sources in a wireless communication device to an outer surface of the wireless communication device, the light guiding member comprising:
a light guiding portion to transmit the light from the plurality of light sources to the outer surface of the wireless communication device, the light guiding portion comprising a light guiding bottom wall surrounding the plurality of light sources and a light guiding sidewall extending from an edge of the light guiding bottom wall, wherein the light guiding sidewall comprises an end surface; and
a light shielding portion to shield the light from the plurality of light sources to the outer surface of the wireless communication device and fix the light guiding portion in the wireless communication device;
wherein the end surface is substantially annular to indicate signal strength and a strong signal orientation received by an antenna of the wireless communication device.

11. The light guiding member as recited in claim 10, wherein color of the end surface indicates the signal strength, and an area of the color of the end surface indicates the strong signal orientation.

12. The light guiding member as recited in claim 11, wherein the end surface of the light guiding member is finely textured and parallel to the plurality of light sources, and other surfaces of the light guiding member are polished.

13. The light guiding member as recited in claim 12, wherein a hypotenuse of a right triangle is formed by a junction of the light guiding bottom wall and the light guiding sidewall.

* * * * *